United States Patent
Grabli et al.

(10) Patent No.: US 7,936,927 B2
(45) Date of Patent: May 3, 2011

(54) CONSTRAINT-BASED ORDERING FOR TEMPORAL COHERENCE OF STROKE-BASED ANIMATION

(75) Inventors: Stephane Grabli, Santa Monica, CA (US); Robert Kalnins, Santa Monica, CA (US); Nathan LeZotte, Los Angeles, CA (US); Amitabh Agrawal, Westchester, CA (US)

(73) Assignee: Auryn Inc., Los Angeles, CA (US)

( * ) Notice: Subject to any disclaimer, the term of this patent is extended or adjusted under 35 U.S.C. 154(b) by 1130 days.

(21) Appl. No.: 11/668,437

(22) Filed: Jan. 29, 2007

(65) Prior Publication Data

US 2007/0177802 A1    Aug. 2, 2007

Related U.S. Application Data

(60) Provisional application No. 60/762,601, filed on Jan. 27, 2006.

(51) Int. Cl.
*G06K 9/46*         (2006.01)
(52) U.S. Cl. ........... 382/202; 382/294; 345/473; 345/17
(58) Field of Classification Search .................. 382/202, 382/294
See application file for complete search history.

(56) References Cited

U.S. PATENT DOCUMENTS

| | | | |
|---|---|---|---|
| 5,182,548 A * | 1/1993 | Haeberli | 345/639 |
| 5,619,626 A | 4/1997 | Huddy | |
| 5,847,712 A | 12/1998 | Salesin et al. | |
| 6,208,360 B1 * | 3/2001 | Doi et al. | 345/474 |
| 6,268,865 B1 | 7/2001 | Daniels et al. | |
| 6,326,972 B1 * | 12/2001 | Buhler et al. | 345/474 |
| 6,603,881 B2 | 8/2003 | Perrone et al. | |
| 6,870,550 B1 | 3/2005 | Schuster et al. | |
| 7,248,270 B1 | 7/2007 | Boylan | |
| 7,456,841 B2 | 11/2008 | Wood et al. | |
| 7,568,171 B2 | 7/2009 | Boylan | |
| 7,746,344 B2 * | 6/2010 | Grabli et al. | 345/473 |
| 2002/0097909 A1 | 7/2002 | Perrone et al. | |
| 2003/0028901 A1 * | 2/2003 | Shae et al. | 725/146 |
| 2005/0007372 A1 | 1/2005 | Ecob et al. | |

OTHER PUBLICATIONS

Stroke surfaces—Video, John et al, Jul. 11, 2005, IEEE, 1077-2626/05, pp. 540-545.*
Stroke surfaces—animations from video, John et al, IEEE, 1077-2626, 2005, pp. 540-549.*
A directional stroke—rendering, Jeong et al., Springer, 2003, LNCS 2669, pp. 326-335.* Painterly rendering for animation, Meier, B.J, Proc of computer graphics, 1996, pp. 477-484.*
PCT International Search Report and Written Opinion, PCT/US07/61249, Feb. 12, 2008, 9 pages.
Meier, B. J., "Painterly Rendering for Animation," Proc. of Computer Graphics, 1996, pp. 477-484.

* cited by examiner

*Primary Examiner* — Samir A Ahmed
*Assistant Examiner* — Jayesh Patel
(74) *Attorney, Agent, or Firm* — Fenwick & West LLP (57) ABSTRACT

A renderer allows for a flexible and temporally coherent ordering of strokes in the context of stroke-based animation. The relative order of the strokes is specified by the artist or inferred from geometric properties of the scene, such as occlusion, for each frame of a sequence, as a set of stroke pair-wise constraints. Using the received constraints, the strokes are partially ordered for each of the frames. Based on these partial orderings, for each frame, a permutation of the strokes is selected amongst the ones consistent with the frame's partial order, so as to globally improve the perceived temporal coherence of the animation. The sequence of frames can then, for instance, be rendered by ordering the strokes according to the selected set of permutations for the sequence of frames.

19 Claims, 4 Drawing Sheets

CONSTRAINT-BASED ORDERING FOR TEMPORAL COHERENCE OF STROKE-BASED ANIMATION

CROSS REFERENCE TO RELATED APPLICATIONS

This application claims the benefit of U.S. Provisional Application No. 60/762,601, filed Jan. 27, 2006, which is incorporated by reference in its entirety.

This application is also related to U.S. application Ser. No. 11/668,449, to Stephane Grabli et al., entitled "Identification of Occlusions in Stroke-Based Rendering," filed Jan. 29, 2007, which is incorporated by reference in its entirety.

BACKGROUND

This invention relates generally to stroke-based animation, and in particular to ordering strokes in stroke-based animation to achieve temporal coherence between frames.

Non-photorealistic rendering is a subfield of computer graphics that offers additional variety in the looks afforded by computer generated animations. In this field, much time and effort have been spent researching algorithms to produce renderings that could imitate traditional media in a variety of artistic styles. Within non-photorealistic rendering, stroke-based rendering is a popular technique in which an image is created by the sequential drawing of atomic image-space discrete elements (the strokes). Painterly Rendering, for instance, is a well known example of stroke-based rendering where each stroke simulates a brush stroke and is rendered through, e.g., an oil painting media simulation. For example, impressionist paintings can be successfully imitated using this technique.

As opposed to photorealistic rendering, the drawing marks used for depiction in stroke-based rendering (e.g., brush strokes) are typically individually distinguishable in the final result. As a consequence, wherever strokes overlap, the order in which they are drawn visually influences the result. For instance, if Vp and Vq are two overlapping strokes, drawing Vp and then Vq would produce a different image than drawing Vq and then Vp.

Because the ordering of strokes is relevant, artists may wish to enforce some specific ordering constraints. These constraints may be motivated by geometric considerations, such as the occlusion within the underlying scene, or aesthetic considerations, such as layering (e.g., having strokes from a highlight layer being drawn on top of an ambient base layer's strokes). These constraints are generally dynamic in that they may change from frame to frame.

In addition to geometric and aesthetic considerations of the artist, the ordering of strokes in stroke-based animation is also relevant to achieving temporal coherence between frames. For example, if two consecutive frames have a different ordering of strokes, disturbing discrete visual events would result everywhere two overlapping strokes change order from one frame to the next. This can be described as a "popping" effect wherever the strokes change order between two frames. To avoid this effect, it is desirable to maximize the temporal coherence of the ordering of the set of strokes from frame to frame, while still respecting the other constraints for each frame. Indeed, for typical scene and viewing conditions, objects evolve smoothly in space and time, so a reasonable general coherence from frame to frame is expected.

In Meier's seminal paper, Barbara J. Meier, Painterly Rendering for Animation, Proc. of Computer Graphics, 1996, p. 477-484, a set of strokes is built from a three-dimensional scene and animated in time. To respect the geometric occlusions observed in the original scene, strokes are rendered from furthest to closest to the viewpoint, reducing the ordering problem to a simple depth-based sorting. This approach is cheap to compute and naturally respects the occlusion constraint, but it suffers from several drawbacks. For example, it enforces only one predefined constraint—the occlusion— and does not allow for the specification of any other constraint. In addition, it does not identify the pairs of strokes where this constraint is necessary, and as a result enforces it for all pairs of strokes, where another choice could lead to more visually pleasant results. Moreover, this approach is prone to structural artifacts that undesirably reveal the three-dimensional nature of the observed image. Finally, it fully pre-determines the temporal coherence of the algorithm in a way that is often far from optimal. For instance, in the case of a vertical plane viewed from a camera tilting vertically back and forth, the order of the strokes will evolve between a permutation and its reverse, although, since it is a convex surface, the order could remain the same at all time without violating any occlusion constraint.

Techniques are thus desired for ordering the strokes drawn in various frames for stroke-based animation to achieve temporal coherence between the frames, while being consistent with and respecting other geometric and aesthetic concerns for the animation.

SUMMARY

To order the strokes for a sequence of frames in a stroke-based animation, a set of constraints that define the ordering of at least some of the strokes in at least some of the frames is received. Typically, these constraints are inputs from an artist creating the animation and may constrain the ordering of the strokes based on layers, occluding objects, or any other constraint that may be relevant to the animation. Using these specified constraints, the strokes are partially ordered for each of the frames. Based on these partial orderings, a temporally coherent set of permutations for the sequence of frames is selected, wherein the permutation selected for each frame is consistent with the partial ordering for its corresponding frame. The sequence of frames is then rendered by ordering the strokes according to the selected set of permutations for the sequence of frames.

In one embodiment, the ordering of strokes is solved as a graph problem, whereby directed graphs are used to determine the order for drawing strokes in the sequence of frames. A plurality of constraints are received (e.g., specified by an artist) for each of a sequence of frames in the animation, where each constraint defines an ordering for a pair of strokes in the associated frame. For each frame, a directed graph (e.g., the occlusion graph) is then created, where each directed graph comprises a directed edge between pairs of overlapping strokes for which a constraint exists in the corresponding frame. In this way, each directed graph defines a relative ordering for drawing at least some of the strokes in the corresponding frame. The directed graphs for the sequence of frames are then merged to form a merged directed graph, and a linear extension (i.e., a topological sort) of the merged directed graph is selected, based at least in part, on the temporal coherence of the ordering to strokes for the sequence of frames. The sequence of frames is then rendered according to the ordering of strokes defined by the selected linear extension.

In embodiments of the invention, the use of occlusion graphs for the strokes allows for representation of the pairwise stroke order constraints for each frame while facilitating the identification of conflicting constraints. The graphs can be used to define for each frame an ordering that respects the specified constraints. According to various embodiments, the graphs can then be used to optimize or otherwise improve the frame-to-frame temporal coherence of the ordering of the strokes.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Techniques described herein may be performed for stroke-based animation, a rendering technique that is well known in the art of computer graphics. In one type of stroke-based animation, two-dimensional brush strokes are built from a three-dimensional model according to any of a variety of known methods, such as Meier's approach referenced above. In Meier's approach, three-dimensional particles are generated on surfaces in a scene, and, for each particle, a two-dimensional stroke is built based on the particle's attributes (e.g., position, orientation, color, and the like). Each stroke can thus be associated with a three-dimensional point. It is noted, however, that the techniques described herein need not be restricted to animating three-dimensional scenes and can be used to generate stroke-based animations from two-dimensional images.

In stroke-based animation where a sequence of frames animates a set of brush strokes, a consistent ordering of strokes between consecutive frames provides temporal coherence and thus avoids undesirable effects in the resulting animation. Embodiments of the invention include techniques for determining an order for drawing the strokes in the sequence of frames to achieve a high degree of temporal coherence with consecutive frames while generally obeying the constraints introduced by the artist when creating the scene.

Figure 1:
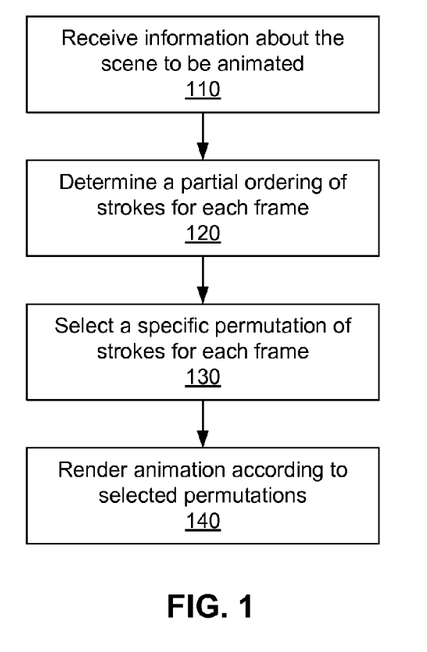
FIG. 1 is a flow chart of an embodiment of a method for ordering rendering a stroke-based animation with strokes ordered to achieve temporal coherence, in accordance with an embodiment of the invention.

A process for selecting the ordering for the strokes in the frames is shown in FIG. 1, which may be performed by a renderer that is designed to generate stroke-based animation. The renderer receives 110 information about the scene to be rendered, which in part constrains the relative ordering of some of the strokes drawn in the resulting frames of the animation. The renderer then divides the determination of the actual ordering of strokes into two parts. The renderer first determines 120 a partial ordering of the strokes for each frame based at least in part on the constraints necessary to achieve a proper rendering of the frame. Once the strokes have been partially ordered for each frame based on the constraints of the animated scene, the renderer selects 130 a specific permutation that fully specifies the stroke ordering for each frame. Because the selected permutations dictate the order of the strokes drawn for each frame the renderer uses these permutations to render 140 the stroke-based animation.

Figure 2:
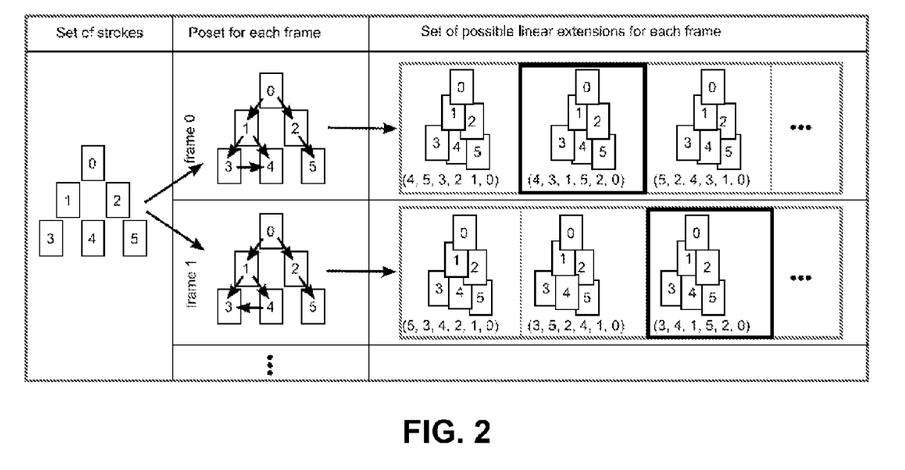
FIG. 2 illustrates an approach for ordering strokes for stroke-based animation using directed graphs, in accordance with an embodiment of the invention.

In one embodiment, the process is performed using graphs, and an example of this graph-oriented approach to solving the problem is illustrated in FIG. 2. An animated three-dimensional scene is depicted using a set of strokes, represented in the first column. The same strokes are generally used in multiple frames, as shown, although they need no be used in every frame. For each frame, the ordering constraints define a partially-ordered set (or poset) of strokes, represented in the second column. As illustrated in the last column, each poset corresponds to a set of linear extensions (or permutations) and, as a result, there are multiple ways of ordering the strokes for each frame while respecting the constraints. Because the constraints may change from frame to frame, the posets may change as well. In this example, the poset changes from frame 0 to frame 1, as stroke 3 moves behind stroke 4.

A set of possible linear extensions for each poset is shown in the last column of FIG. 2. Each linear extension of the poset is a permutation of the stroke ordering that would be consistent with the constraints defined for the corresponding frame. With these linear extensions identified, one linear extension is then chosen for each frame. Preferably, this is done so that the frame-to-frame distance between permutations is minimized or otherwise reduced. In this example, the renderer selects the second permutation for frame 0 (4, 3, 1, 5, 2, 0) and the third permutation for frame 1 (3, 4, 1, 5, 2, 0). These two permutations differ by only one adjacent transposition, and they have the added benefit of "hiding" the inconsistency by burying the associated strokes near the bottom.

Determination of Constraints from Scene Information

In a typical rendering pipeline, the renderer receives scene information that describes the geometry of the three-dimensional objects being animated, information about various layers being painted (e.g., background, foreground, highlights), and various other settings and options that indicate how the renderer should generate the animated scene. From this scene information, the renderer can prepare a sequence of frames and generate brush strokes for each of the frames. In part, the renderer uses this scene information to determine whether particular brush strokes need to be drawn over other strokes. The relative ordering between brush strokes can be determined from the scene information or be provided explicitly as part of the scene information. When the relative ordering of two strokes is indicated by the scene information, the result is a constraint associated with a particular frame.

Each constraint defines a relative ordering for at least a pair of strokes in a particular frame. For example, a constraint may specify that a first stroke shall be drawn before a second stroke in a particular frame; therefore, if the strokes overlap, the second stroke will appear on top of the first. The constraint may thus be used to enforce a given ordering of the strokes drawn in each frame, which may be necessary for a proper depiction of a rendered image. Various embodiments allow for the flexible specification of ordering constraints between pairs of strokes. In one embodiment, two specific constraints are used: the occlusion constraint and the layer constraint. However, it can be appreciated that other types of ordering constraints may be used with the techniques described herein.

An occlusion constraint may be specified when it is determined that overlapping strokes should be drawn from furthest to closest. This may occur, for example, when two overlapping strokes belong to objects that have different depths in the three-dimensional model. Considering two brush strokes, $V_p$ and $V_q$, respectively associated with the three-dimensional points P and Q, the occlusion constraint can be defined by:

$$V_p \underset{occ}{\rightarrow} V_q \Leftrightarrow \begin{cases} V_p \text{ and } V_q \text{ overlap} & (1) \\ (P, Q) \text{ corresponds to a geometric occlusion} & (2) \\ \text{depth}(P) < \text{depth}(Q) & (3) \end{cases}$$

In this embodiment, once it is determined that two overlapping strokes represent a geometric occlusion, their relative order is simply set using their respective depth. Intuitively, two overlapping strokes represent an occlusion when they belong to different patches of surface with respect to the view. Embodiments for methods of verifying whether two overlapping strokes represent a geometric occlusion are described in related U.S. Patent Application entitled "Identification of Occlusions in Stroke-Based Rendering," to Stephane Grabli et al., referenced above.

Another type of constraint that may be used is a layer constraint. It is a common practice to realize a painting as the superimposition of several layers. For instance, a highlight layer is often drawn on top of a base ambient layer. Layer constraints allow the artist to enforce an ordering between overlapping strokes based on the layers to which the strokes belong. In one implementation, each stroke is associated with a layer index that indicates the layer to which the stroke belongs. Using the convention that layers of higher indices must be drawn on top of layers of lower indices, the layer constraint can be defined as follows:

$$V_p \underset{layer}{\rightarrow} V_q$$

if $V_p$ and $V_q$ overlap and have layer indices $\text{index}_p$ and $\text{index}_q$ such that $\text{index}_q < \text{index}_p$.

Defining Partially Ordered Sets of Strokes for the Frames

Once the brush strokes are generated and positioned for each frame, the renderer decides the order in which to draw the brush strokes in each frame. Typically, some brush strokes in a frame must overlap other strokes following a specific order so that the image in the frame will appear correct. However, many of the brush strokes in a given frame are unconstrained, as their relative ordering makes no difference for the proper depiction of the frame. This partial ordering may change from frame to frame because the images depicted therein also change.

For each frame in an animation (i.e., a sequence of frames), a partially-ordered set of strokes is determined according to any relevant constraints. In one embodiment, the partial ordering of strokes for a particular frame is expressed as a directed graph. The relative ordering in the graph determines the order in which the corresponding strokes are drawn in the frame. The direction of the graph may be defined either way (from first to last drawn, or from last to first drawn), but the convention should be consistent among the frames.

In one embodiment, the renderer tests all pairs of overlapping strokes for occlusion constraints only, as described above. Whenever an occlusion is found between two strokes in a particular frame, an oriented edge is added to a directed graph for the corresponding frame from the occluding stroke to the occluded stroke. This results in a directed acyclic graph (DAG) for each frame that defines a partial order relation for the set of strokes, i.e., a poset. In this way, a poset may be generated for each frame in the sequence as a graph that constrains the ordering of at least some of the strokes associated with each frame. In another embodiment, a directed graph is built for each of the frames in the animation according to the layer constraint only.

Figure 3:
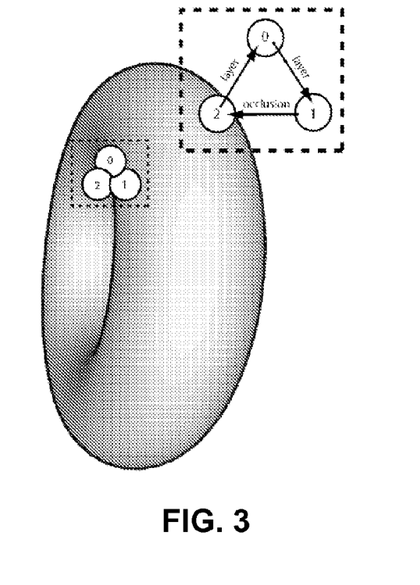
FIG. 3 illustrates an example in which a set of constraints may conflict, causing a circuit, in accordance with an embodiment of the invention.

It is noted that a graph built using either the layer constraint or the occlusion constraint (but not both) will be acyclic and will therefore define a partial order for the set of strokes in a given frame. But when both layer and occlusion constraints (or any other constraints that may conflict) are enforced, the resulting graph generally contains circuits (i.e., paths in the graph that form a loop) and thus does not define a partial order for the strokes since it is no longer acyclic. FIG. 3 shows an example of a circuit having three strokes. In this example, stroke 2 should be drawn over stroke 0 and stroke 0 should be drawn over stroke 1 both due to layer constraints, but stroke 1 should be drawn over stroke 2 due to an occlusion constraint. The circuit results in an inconsistent set of constraints and thus fails to define a partial ordering that can be achieved.

Figure 4:
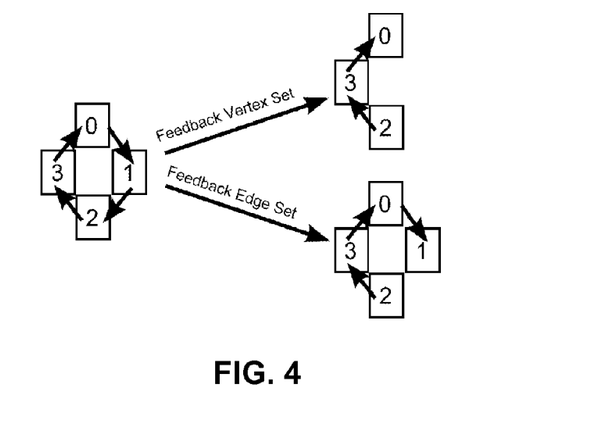
FIG. 4 illustrates a method for removing a circuit in a directed graph by removing at least one of vertex or a constraint, in accordance with an embodiment of the invention.

However, the use of graphs provides mechanisms to determine whether the system is over-constrained and to identify the strokes responsible for each conflict. Because the purpose of the graphs is to define a partial order for the strokes, and because circuits are logically inconsistent with this purpose, all circuits should be removed from the graph for each frame. In one embodiment, a circuit is removed from a particular graph by identifying one or more strokes in the circuit and removing at least one of the strokes. Alternatively, a circuit can be removed by identifying one or more constraints that create a circuit and removing at least one of those constraints. Each of these alternatives is illustrated in FIG. 4. It is then desirable to identify either the minimal number of strokes or the minimal number of constraints, depending on what solution is more acceptable, that need to be removed to make the graph acyclic. The general solution to this problem is equivalent to finding the minimal feedback vertex set or the minimal edge feedback set, depending on whether we are trying to remove strokes or constraints. This problem is known to be NP-complete; however, an approximation algorithm proves sufficient in the context of stroke-based rendering.

In one embodiment, strokes are removed rather than constraints. To perform this, an approximation algorithm is used based on knowledge of the ordering constraints that are enforced. This algorithm is fairly coherent in time and removes only nonessential strokes. The algorithm is based on the observation that by removing from the graph any stroke $V_q$ verifying the following property:

$$\exists V_p / \begin{cases} V_p \underset{occ}{\rightarrow} V_q \\ V_p \underset{layer}{\leftarrow} V_q \end{cases},$$

then all possible conflicts between occlusion and layer partial orders are removed. As a result, the antisymmetry property of the binary relation induced by these constraints on the set of strokes is restored and the result is a partially ordered set. In one embodiment, all of the binary cycles are detected, and the strokes verifying the property above are removed. Intuitively, all of the strokes from upper layers that lie near silhouettes will be removed. For continuous surfaces and motions, the set of strokes evolves smoothly under this rule. In this way, for each frame a directed acyclic graph can be built that properly expresses the occlusion and layer constraints of the frame. The topological sorting of this graph gives a reverse order in which the strokes must be drawn to match the desired goals.

This graph construction algorithm builds an edge for any pair of strokes verifying either the occlusion constraint or the layer constraint in a frame. However, where the rendering process is ultimately concerned only with a topological sort of that graph, it would be useless to build an edge $V_p \rightarrow V_q$ as soon as there exists another path from $V_p$ to $V_q$. Therefore, the transitive reduction of the graph is used rather than the graph itself. The use of a transitive reduction of the graph instead of the graph itself is useful in certain computing contexts where limited resources would not allow for large graphs. In one embodiment, the transitive reduction for a given graph is computed while the graph is being built and each time a memory threshold is reached.

Choosing a Temporally Coherent Sequence of Permutations

With the partially ordered graphs built for each frame, a complete ordering, or permutation of the partial ordering, of the strokes is selected. To achieve temporal coherence, it is desirable to have a consistent ordering of the strokes in consecutive frames. Therefore, the permutations of strokes are selected to achieve a high degree of the temporal coherence for the sequence of frames, even if total temporal coherence (e.g., no "popping") is not possible. Various techniques may be used to optimize or increase the temporal coherence of the frames.

In the general case, a partial order as described above can lead to multiple linear extensions of the set of strokes, i.e., many different permutations. The smaller the number of constraints, the sparser the graph and the larger the number of possible linear extensions. This indeterminism signifies that the permutations obtained by independently sorting any two frames occlusion graph can be arbitrarily different, even if the two occlusion graphs are exactly the same. Doing so would therefore lead to a highly incoherent animation where visual popping due to order changes randomly happens throughout the image. Since typical animation uses smooth camera and objects motion, one can accept a reasonable amount of coherence from frame to frame and thus try to make, as much as possible, each frame's permutation the closest to the previous and next frame's ones.

Storing the poset of strokes as a graph allows the renderer to postpone the choice of the permutation to a stage where the cost of temporal coherence can be considered. In one embodiment, the renderer is configured to choose, for each frame f, one permutation $l_f$ among the possible ones, to minimize the maximum distance between any two consecutive frame permutations. Other minimizations or definitions for the optimal temporal coherence may be defined.

The distance between two permutations $l_1$, $l_2$ of the same set V can, for instance, be defined as the number of pairs of elements being in different order in the two permutations. The sequence-permutation-diameter of a sequence of permutations can be defined as the maximum distance between any two permutations of that sequence. In one embodiment, the temporal coherence goal is formulated as the following optimization problem: For a given distance between two permutations, find the sequence of permutations for the animation with the smallest sequence-permutation-diameter.

Trying to solve this problem using a brute-force approach would lead to a very computationally expensive algorithm. Indeed, generating the set L of all linear extensions of a poset is a constant amortized time algorithm (see Pruesse, G. and Ruskey, F. 1994. Generating Linear Extensions Fast. *SIAM J. Comput.* 23, 2 (April 1994), 373-386)—i.e., of complexity O(|L|)—and even counting the number of these extensions is #P-complete (see Brightwell, G. and Winkler, P. 1991. Counting linear extensions is #P-complete. In *Proceedings of the Twenty-Third Annual ACM Symposium on theory of Computing* (New Orleans, La., United States, May 5-8, 1991). STOC '91. ACM Press, New York, N.Y., 175-181).

One embodiment of the invention overcomes this complexity by leveraging the use of graphs to select each frame's best permutation. This can be performed by first building the union of the partially ordered graphs from all frames. Whenever two vertices (i.e., strokes) correspond to the same stroke but at two different frames, they are defined as mergeable. According to one embodiment of the invention, the renderer attempts to merge the highest number of mergeable vertices without creating any circuit. A circuit is a loop in the dependency of the graph, and in the present context a circuit is an inconsistency in the constraints. The result of this merging is a directed acyclic graph (DAG), which is a poset that expresses all the constraints applying to the set of strokes in the entire sequence of frames. Therefore, any single permutation defined by this poset can be used for all frames in the sequence. The same stroke can appear multiple times in the permutation through different vertices, which may happen if the stroke could not be merged at least for one pair of frames. In such a case, when rendering a given frame, vertices that do not belong to that frame may simply be ignored.

Figure 5:
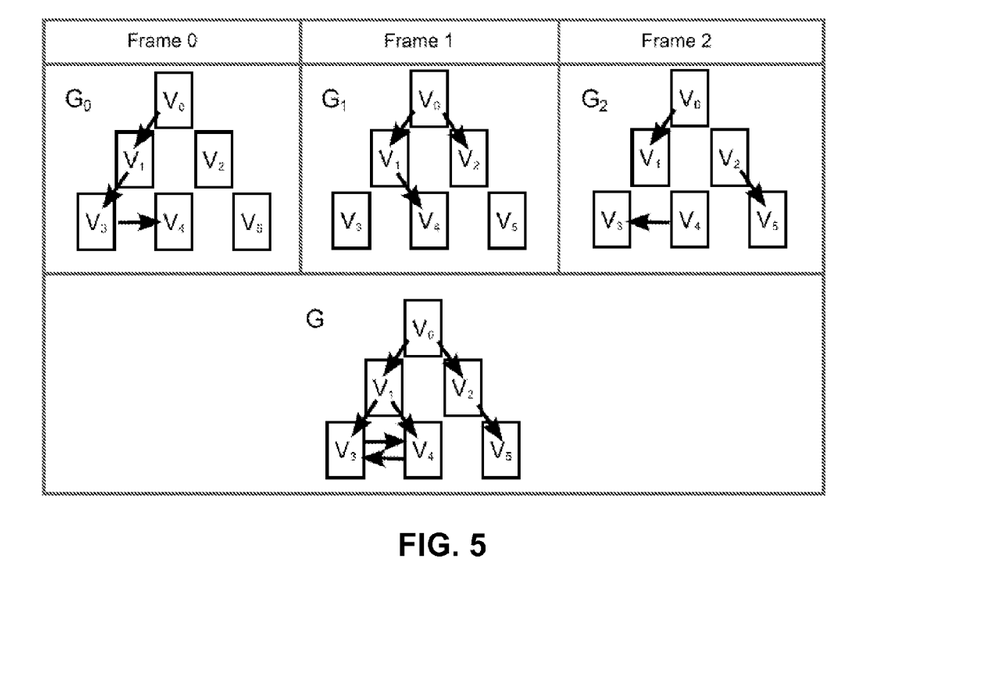
FIG. 5 illustrates the union of directed graphs, in accordance with an embodiment of the invention.

This approach is now described in more details. Let $G_1=(V,E_1)$, $G_2=(V,E_2)$, ... $G_n=(V,E_n)$ be a sequence of graphs representing different partial orders on the same set of elements V, and $L_i$ be the set of linear extensions defined by each $G_i$. A graph $G=(V,E)$ can then be built such that $E=E_1 \cup E_2 \cup ... \cup E_n$. An example of such a union of graphs from three frames is illustrated in FIG. 5. It can be seen that G is not acyclic because of the binary cycle existing between $V_3$ and $V_4$.

If G is acyclic, then it is a partial ordered set and it defines a set of linear extensions L. It is observed that $L=L_1 \cap L_2 \cap ... \cap L_n$. As a result, any member of L represents a valid ordering for all $G_i$. Unfortunately, G is generally not acyclic, so the ordering cannot be expressed as a single linear extension for the whole sequence. However, this idea can be generalized to define an approach to obtain, in the general case, a sequence of linear extensions $l_i$ such that $$\max_{i,j \in [0,n]} (dist(l_i, l_j))$$

is minimized, as shown in the following.

Figure 6:
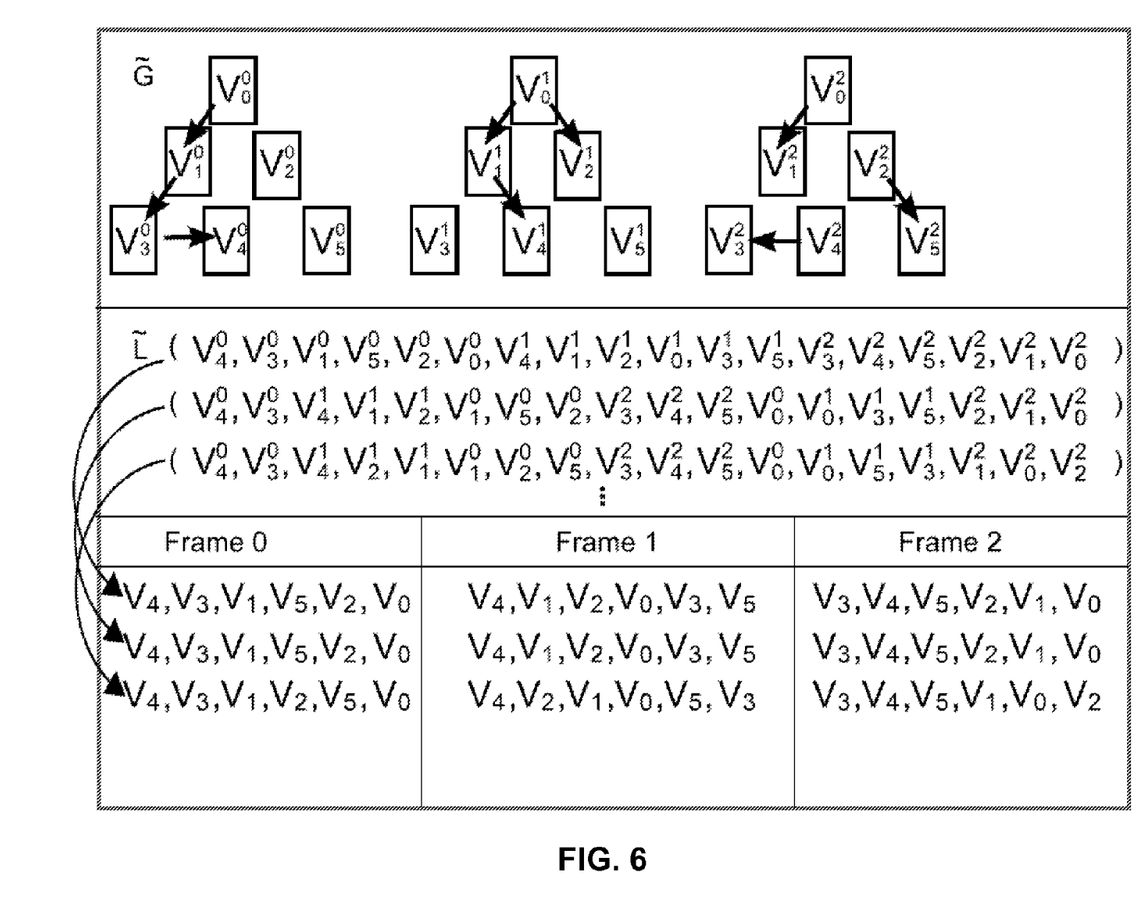
FIG. 6 illustrates a disjoint union of the graphs shown in FIG. 5, in accordance with an embodiment of the invention.

If $V=\{v_0, v_1, \ldots, v_m\}$ is the set of strokes, for each frame i the graph $\tilde{G}_i=(\tilde{V}_i,\tilde{E}_i)$ is defined, with $\tilde{V}_i=\{v_0^i v_1^i, \ldots v_m^i\}$ such that each vertex $v_j^i$ is now a couple vertex/frame number $(v_i,j)$ and $\tilde{E}_i=\{(v_k^i,v_l^i)/(v_k,v_l)\in E_i\}$. $\tilde{G}$ is built as the union of the disjoint graphs $\tilde{G}_i$. Initially, the set of linear extensions $\tilde{L}$ defined by $\tilde{G}$ is exactly equal to the Cartesian product $\tilde{L}_0 \times \tilde{L}_1 \times \ldots \times \tilde{L}_n$ of the disjoint sets $\tilde{L}_i$. $\tilde{G}$ and $\tilde{L}$, the disjoint union of the graphs introduced in FIG. 5, are illustrated in FIG. 6. FIG. 6 indicates the drawing order for the strokes at each frame for each element of $\tilde{L}$ shown. In this example, $\dim(\tilde{L})=18$.

If, in $\tilde{G}$, all vertices $\{v_k^i\}_k$ sharing the same stroke $v_i$ are merged, the result becomes the graph G described above.

Figure 7:
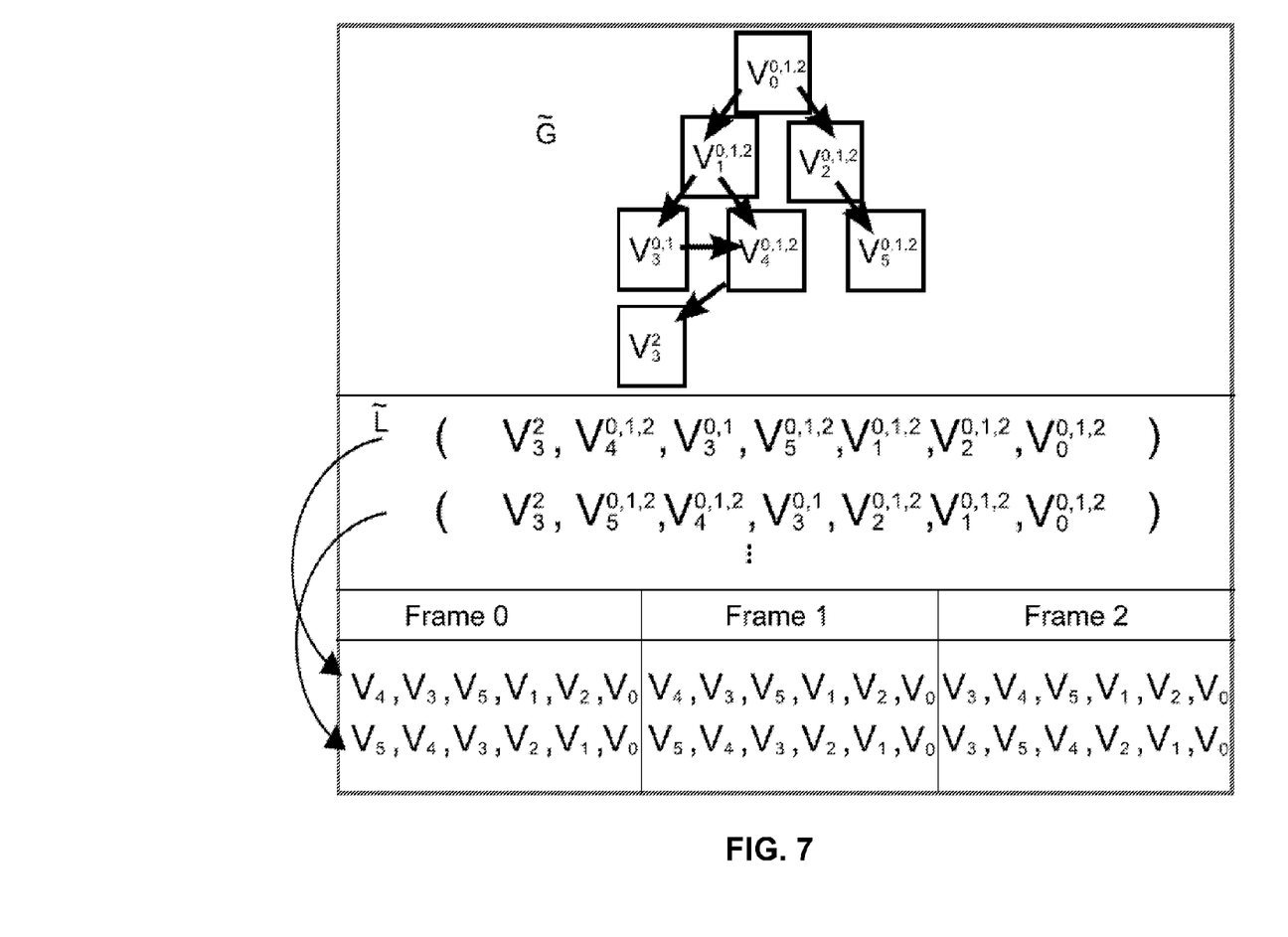
FIG. 7 illustrates the result of merging the graphs shown in FIG. 5 without creating circuits, in accordance with an embodiment of the invention.

Since the goal is to produce an acyclic graph that can be used for the ordering, only two vertices $v_k^i$ and $v_l^i$ are merged if the merging does not create a circuit in $\tilde{G}$. Intuitively, each merge shrinks the dimension of the space $\tilde{L}$, bringing it closer to L and therefore reducing the sequence-permutation-diameter, as illustrated in FIG. 7. By merging vertices across frames, the temporal coherence of the animation can be improved. In one embodiment, therefore, the goal is to merge the highest number of vertices in $\tilde{G}$. FIG. 7 illustrates the result of merging the vertices sharing the same stroke without creating cycles. In this example, the only unmerged vertex left is $V_3^2$. The dimension of $\tilde{L}$ shrinks from 18 to 7 as the vertices are merged. In the last raw of the table, it is shown that a smaller space $\tilde{L}$ directly leads to smaller frame-to-frame distances between permutations.

In one embodiment, this approach is implemented using the following "greedy algorithm":

$\tilde{G}=\emptyset$ for each frame i $\tilde{G}=\tilde{G}\cup\tilde{G}_i$

Merge as many vertices as possible in $\tilde{G}$

Rather than trying to find the maximum number of vertices that can be merged without creating circuits, the renderer may instead merge all vertices and then try to find the minimal set of vertices to split so that all circuits are removed. This is equivalent to the problem of finding a minimal feedback vertex set, described above. Since this is an NP-complete problem, the renderer may use an approximation algorithm. In one embodiment, this approximation algorithm is based on the work by Demetrescu et al. (see Demetrescu, C. and Finocchi, I. 2003. Combinatorial algorithms for feedback problems in directed graphs. *Inf. Process. Lett.* 86, 3 (May. 2003), 129-136). The time complexity of this algorithm is $O(|E|\cdot|V|)$, and the approximation ratio is bounded by the length of the longest simple circuit of the graph.

Additional Optimizations

In one embodiment, the negative visual effects of any violation of temporal coherence are reduces by "hiding" them beneath other strokes as described below.

For each vertex of the merged graph, a lifetime is defined as the number of consecutive frames for which that vertex was merged. The vertices having longer lifetimes correspond to the most coherent strokes in the sequence of frames. In one embodiment, once the renderer has a unique directed acyclic graph for the whole sequence, rather than picking any permutation out of the ones defined by its topological sorting, the renderer attempts to select the permutation so that the shortest lifetime vertices are at the beginning of the permutation so that most of the popping due to their appearance or disappearance is hidden by foremost strokes. Indeed, by placing these vertices at the beginning, their corresponding strokes are drawn earlier and are thus more likely to be covered by other strokes. Selecting such a permutation is equivalent to finding the lexicographically smallest topological sorting of the partial order defined by the combined graph. In one embodiment, this is achieved by presorting the vertices by lifetime before their topological sorting (see A. V. Anisimov and D. E. Knuth. Inhomogeneous sorting. In *International Journal of Parallel Programming*, Springer Netherlands, Vol. 8, N. 4, August 1979).

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system or similar electronic computing device, which manipulates and transforms data represented as physical (electronic) quantities within the computer system memories or registers or other such information storage, transmission, or display devices.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

Embodiments of the invention may also relate to an animation product that comprises a machine-readable medium, where the machine-readable medium contains media data that is operable to cause a video machine to produce a video stream for playback on a video display. The media data stored on the machine-readable medium are produced using embodiments of the methods and processes described herein. The animation product may thus comprise any type of medium with the appropriate media data stored thereon that can be played on a video machine. Examples include DVDs that can be played on DVD players, storage devices that can provide media for playback on a computing device (including computers, cellular phones, and any other computing device capable of playing video), film onto which video images are placed for display using a projector system, and any other product suitable for display of the media data thereon in conjunction with a video machine for playing back the corresponding video stream.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and it may not have been selected to delineate or circumscribe the inventive subject matter. Accordingly, the disclosure of the embodiments of the invention is intended to be illustrative, but not limiting, of the scope of the invention, which is set forth in the following claims.

What is claimed is:

1. A method for making a stroke-based animation with temporal coherence, the method comprising:
    receiving a plurality of constraints for each of a sequence of frames, each constraint defining an ordering for at least a pair of strokes in the associated frame;
    creating a directed graph for each frame, each directed graph comprising a directed edge between pairs of overlapping strokes for which a constraint exists in the corresponding frame, each directed graph thereby defining a relative ordering for drawing at least some of the strokes in the corresponding frame;
    merging the directed graphs for the sequence of frames to form a merged directed graph;
    selecting a linear extension of the merged directed graph, the selecting optimizing, at least in part, the temporal coherence of the ordering of strokes for the sequence of frames; and
    producing a sequence of ordered lists of strokes that is usable for rendering the animation and that corresponds to the sequence of frames, according to the ordering of strokes defined by the selected linear extension.

2. The method of claim 1, wherein the selecting comprises hiding temporal incoherencies by selecting the linear extension that tends to order strokes for which there are inconsistencies earlier, thereby causing the strokes associated with more incoherencies to be drawn earlier.

3. The method of claim 1, wherein a lifetime of a vertex in the merged directed graph is defined by the number of consecutive frames with which the vertex is associated, and the selecting comprises favoring the linear extension for which vertices with shorter lifetimes in the directed graph correspond to earlier drawn strokes.

4. The method of claim 1, wherein the constraints are determined at least in part according to occlusions of surfaces associated with the strokes in scene information provided for the stroke-based animation.

5. The method of claim 1, wherein the constraints are determined at least in part according to an association of the strokes with layers defined in scene information provided for the stroke-based animation.

6. The method of claim 1, wherein creating a directed graph for a particular frame comprises:
    removing any circuits in the graph to make the graph a directed acyclic graph.

7. The method of claim 1, wherein the merging produces a directed acyclic graph.

8. The method of claim 1, wherein creating a directed graph for a particular frame comprises:
    replacing the directed graph with a transitive reduction of the directed graph.

9. The method of claim 1, wherein the selecting comprises a step for optimizing to globally minimize one or more distances between consecutive frames' stroke ordering.

10. A computer program product for making a stroke-based animation with temporal coherence, the computer program product comprising a non-transitory computer-readable medium storing computer program code for performing the method comprising:
    receiving a plurality of constraints for each of a sequence of frames, each constraint defining an ordering for at least a pair of strokes in the associated frame;
    creating a directed graph for each frame, each directed graph comprising a directed edge between pairs of overlapping strokes for which a constraint exists in the corresponding frame, each directed graph thereby defining a relative ordering for drawing at least some of the strokes in the corresponding frame;
    merging the directed graphs for the sequence of frames to form a merged directed graph;
    selecting a linear extension of the merged directed graph, the selecting optimizing, at least in part, the temporal coherence of the ordering of strokes for the sequence of frames; and
    producing a sequence of ordered lists of strokes that is usable for rendering the animation and that corresponds to the sequence of frames, according to the ordering of strokes defined by the selected linear extension.

11. The computer program product of claim 10, wherein the selecting comprises hiding temporal incoherencies by selecting the linear extension that tends to order strokes for which there are inconsistencies earlier, thereby causing the strokes associated with more incoherencies to be drawn earlier.

12. The computer program product of claim 10, wherein a lifetime of a vertex in the merged directed graph is defined by the number of consecutive frames with which the vertex is associated, and the selecting comprises favoring the linear extension for which vertices with shorter lifetimes in the directed graph correspond to earlier drawn strokes.

13. The computer program product of claim 10, wherein the constraints are determined at least in part according to occlusions of surfaces associated with the strokes in scene information provided for the stroke-based animation.

14. The computer program product of claim 10, wherein the constraints are determined at least in part according to an association of the strokes with layers defined in scene information provided for the stroke-based animation.

15. The computer program product of claim 10, wherein creating a directed graph for a particular frame comprises:
    removing any circuits in the graph to make the graph a directed acyclic graph.

16. The computer program product of claim 10, wherein the merging produces a directed acyclic graph.

17. The computer program product of claim 10, wherein creating a directed graph for a particular frame comprises:
    replacing the directed graph with a transitive reduction of the directed graph.

18. The computer program product of claim 10, wherein the selecting comprises a step for optimizing to globally minimize one or more distances between consecutive frames' stroke ordering.

19. An animation product comprising a non-transitory machine-readable medium, the non-transitory machine-readable medium storing media data that when read by a video machine causes the video machine to produce a video stream for playback on a video display, the media data generated according to a process that comprises any one of the preceding method claims.

* * * * *